(12) United States Patent
Kim

(10) Patent No.: US 9,110,520 B2
(45) Date of Patent: Aug. 18, 2015

(54) METHOD AND DEVICE FOR SENSING ROTATION OF WHEEL IN PORTABLE TERMINAL

(75) Inventor: Hak Hyeon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2546 days.

(21) Appl. No.: 11/770,175

(22) Filed: Jun. 28, 2007

(65) Prior Publication Data

US 2008/0122809 A1   May 29, 2008

(30) Foreign Application Priority Data

Nov. 23, 2006  (KR) ........................ 10-2006-0116360

(51) Int. Cl.
   *G09G 5/00*   (2006.01)
   *G06F 3/033*  (2013.01)
   *G06F 3/038*  (2013.01)
   *G01D 5/245*  (2006.01)
   *G06F 3/0362* (2013.01)

(52) U.S. Cl.
   CPC .............. *G06F 3/038* (2013.01); *G01D 5/2451* (2013.01); *G06F 3/0362* (2013.01)

(58) Field of Classification Search
   CPC ............................. G06F 3/038; G06F 3/0362
   USPC ........................ 345/156–157, 164, 167, 184; 73/114.26, 504.01–504.17
   See application file for complete search history.

(56) References Cited

U.S. PATENT DOCUMENTS

| | | | | |
|---|---|---|---|---|
| 4,403,193 A | * | 9/1983 | Takemura | 327/4 |
| 4,442,532 A | * | 4/1984 | Takemura | 377/3 |
| 5,856,792 A | * | 1/1999 | Stevens | 340/870.43 |
| 5,931,873 A | * | 8/1999 | Cisar | 701/1 |
| 5,936,613 A | * | 8/1999 | Jaeger et al. | 345/172 |
| 6,353,429 B1 | * | 3/2002 | Long | 345/158 |
| 6,538,640 B1 | * | 3/2003 | Ostrum et al. | 345/163 |
| 2003/0095096 A1 | * | 5/2003 | Robbin et al. | 345/156 |

FOREIGN PATENT DOCUMENTS

KR   1020060100952 A   9/2006

* cited by examiner

*Primary Examiner* — Matthew Fry
(74) *Attorney, Agent, or Firm* — Jefferson IP Law, LLP

(57) ABSTRACT

A method of sensing the rotation of a wheel in a portable terminal is provided. The method includes producing at least one interrupt through any one of a plurality of sensors provided in the wheel according to the rotation of the wheel, confirming an interrupt value of the produced interrupt, and a status value of a sensor which did not produce the interrupt among the plurality of sensors, and determining that the wheel is rotated in a direction corresponding to the interrupt value and the status value.

9 Claims, 7 Drawing Sheets

| INTERRUPT VALUE OF 1ST SENSOR | STATUS VALUE OF 2ND SENSOR | ROTATION DIRECTION OF WHEEL |
|---|---|---|
| R | L | CLOCKWISE |
| F | H | CLOCKWISE |
| R | H | COUNTERCLOCKWISE |
| F | L | COUNTERCLOCKWISE |

FIG.6A

| INTERRUPT VALUE OF 2ND SENSOR | STATUS VALUE OF 1ST SENSOR | ROTATION DIRECTION OF WHEEL |
|---|---|---|
| R | H | CLOCKWISE |
| F | L | CLOCKWISE |
| R | L | COUNTERCLOCKWISE |
| F | H | COUNTERCLOCKWISE |

FIG.6B

METHOD AND DEVICE FOR SENSING ROTATION OF WHEEL IN PORTABLE TERMINAL

PRIORITY

This application claims the benefit under 35 U.S.C. §119(a) of a Korean patent application filed on Nov. 23, 2006 in the Korean Industrial Property Office and assigned Serial No. 2006-116360, the entire disclosure of which is hereby incorporated by reference.

BACKGROUND OF THE INVENTION

1. Field of the Invention

The present invention relates to a portable terminal. More particularly, the present invention relates to a method and a device for sensing rotation of a wheel in a portable terminal.

2. Description of the Related Art

In general, a "portable terminal" typically refers to an appliance for executing communication and data exchange while moving. Recently, various and useful functions have been implemented in portable terminals so as to be suited to the digital convergence era. For example, a user may use Audio On Demand (AOD) and Video On Demand (VOD) services, make a video call with a counterpart while watching a moving image of the face of the counterpart, or download and play a game. As the functions implemented in the portable terminals are diversified, a number of keys included in the portable terminals is gradually increased. With the increase of the number of keys in the portable terminals, the portable terminals gradually become larger, and users feel difficulty in using the terminals. In order to solve this problem, a portable terminal may be provided with a wheel, which allows a user of the portable terminal to easily control various functions of the portable terminal. Typically, a conventional wheel has two sensors, wherein the wheel is operated in such a way that an interrupt pattern of the two sensors caused by the rotation of the wheel is confirmed and the wheel is rotated in the direction corresponding to the interrupt pattern. However, the way to detect the rotation of the wheel through an interrupt pattern in this manner has a problem in that the swiftness and precision in sensing the movement of the wheel are poor. Therefore, what is needed is to enable the movement of such a wheel of a portable terminal to be swiftly and precisely detected so that the portable terminal can be more easily controlled.

SUMMARY OF THE INVENTION

An aspect of the present invention is to address the above-mentioned problems and/or disadvantages and to provide at least the advantages described below.

Accordingly, an aspect of the present invention is to provide a method and device for sensing the rotation of a wheel in a portable terminal, by which the movement of the wheel can be swiftly and precisely detected.

According to an aspect of the present invention, a method of sensing the rotation of a wheel in a portable terminal is provided. The method includes producing at least one interrupt through any one of a plurality of sensors provided in the wheel according to the rotation of the wheel, confirming an interrupt value of the produced interrupt and a status value of a sensor which did not produce the interrupt among the plurality of sensors, and determining that the wheel is rotated in a direction corresponding to the interrupt value and the status value.

According to another aspect of the present invention, a device for sensing the rotation of a wheel in a portable terminal is provided. The device includes a plurality of sensors for producing at least one interrupt or remaining in a predetermined status value according to the rotation of the wheel, a memory unit for containing mapping tables related to the rotation directions corresponding to the interrupt values and the status values of the sensors according to the rotation of the wheel, and a control unit for confirming an interrupt value of the produced interrupt and a status value of a sensor which did not produce the interrupt among the plurality of sensors, and for determining that the wheel is rotated in a direction corresponding to the interrupt value and the status value with reference to the mapping tables.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 6A and 6B are diagrams illustrating mapping tables of a sensing algorithm according an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
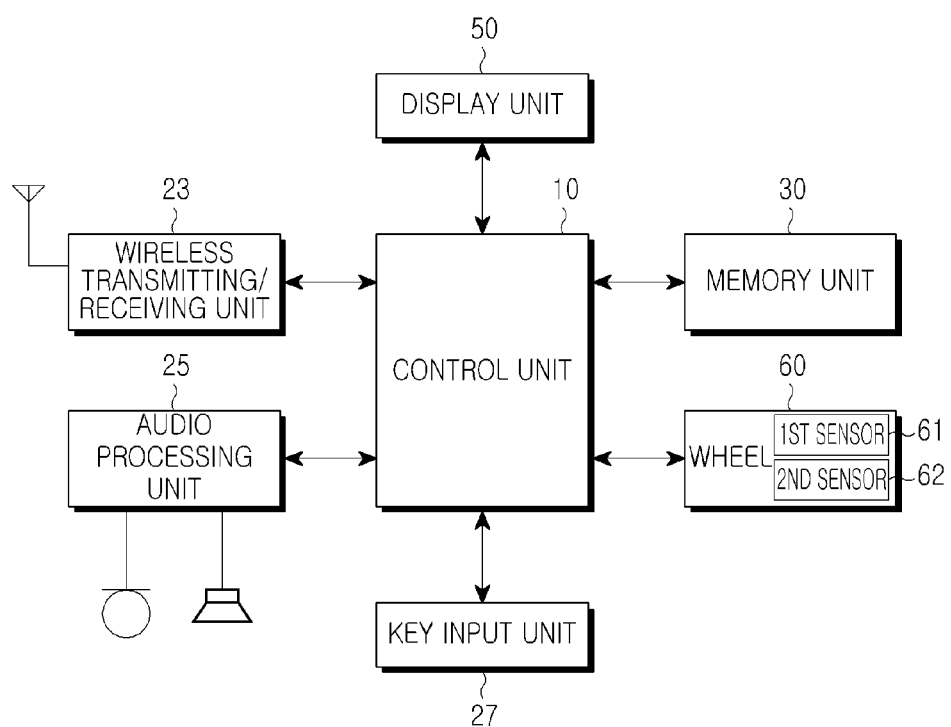
FIG. 1 is a block diagram illustrating a portable terminal according to an exemplary embodiment of the present invention.

FIG. 1 is a block diagram illustrating a portable terminal according to an exemplary embodiment of the present invention.

Referring to FIG. 1, a wireless transmitting/receiving unit 23 includes an RF unit (not shown) and a MODEM (not shown). The RF unit includes an RF transmitter (not shown) for upward converting and amplifying the frequency of a transmitted signal, and an RF receiver (not shown) for low-noise amplifying a received signal and down-converting the frequency of the received signal. The MODEM includes a transmitter (not shown) for encoding and modulating a signal to be transmitted from the RF unit, and a receiver (not shown) for demodulating and decoding a signal received by the RF unit.

An audio processing unit 25 may include codecs (not shown), which include a data codec and an audio codec. The data codec processes packet data, and the audio codec processes an audio signal such as a sound or a multimedia file. The audio processing unit 25 converts a received digital signal into an analog signal through the audio codec and then reproduces the analog signal or converts an analog audio signal generated from a microphone into a digital audio signal and transmits the digital signal to the MODEM. The codecs may be provided separately or enclosed within a control unit 10.

A key input unit 27 includes keys required for inputting numeric and character information and function keys required for setting various functions.

A memory unit 30 may be configured with a program memory and a data memory. A program for controlling usual movements of the portable terminal may be stored in the program memory. The memory unit 30 according to an exemplary embodiment contains one or more mapping tables of an algorithm for sensing the movements of a wheel. The rotating directions of the wheel, which correspond to interrupt values of a sensor producing an interrupt and status values of a sensor not producing an interrupt when the wheel rotates, respectively, are mapped in the mapping tables.

A display unit 50 may include a Liquid Crystal Display (LCD) or an Organic Light Emitting Diode (OLED). The display unit 50 outputs various pieces of display information generated by the portable terminal. At this time, if the LCD or OLED is implemented in a touch screen type, the display unit 50 may serve as an input unit for controlling the portable terminal together with the key input unit 27.

The wheel 60 is a means for searching a menu or a list or for performing a specific function when a user rotates the wheel 60 using his or her finger. The wheel 60 according to an exemplary embodiment of the present embodiment includes a first sensor 61 and a second sensor 62. The first and second sensors 61 and 62 detect the rotation of the wheel 60 and periodically and alternately produce interrupts, and remain in a predetermined status value (High or Low) until a next interrupt is produced. In an exemplary implementation, when the wheel 60 is rotated in a direction, one of the two sensors produces an interrupt and the other remains in (outputs) a predetermined status value without producing an interrupt. At this time, the interrupt produced by one of the first and second sensors 61 and 62 has a rising edge value or a falling edge value.

The control unit 10 converts and controls the entire operation or drive modes of the portable terminal. The control unit 10 determines that the wheel is rotated in a direction corresponding to the interrupt values and status values of the sensors (first and second sensors) obtained according to the rotation of the wheel 60.

Figure 2:
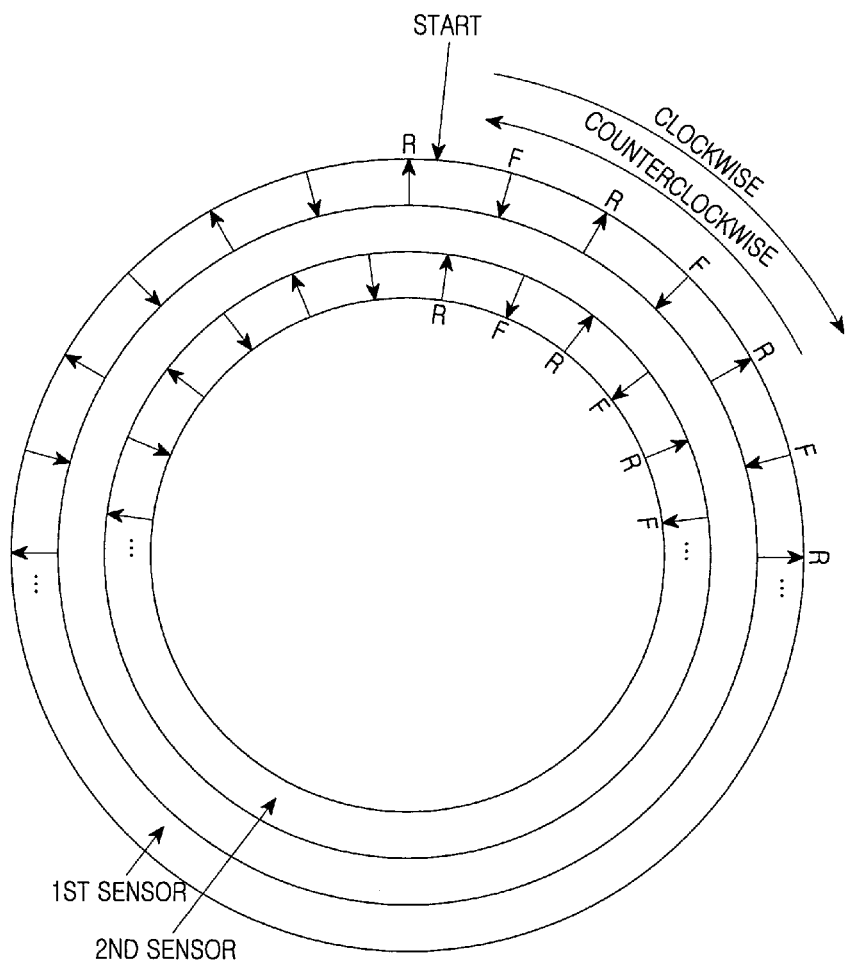
FIG. 2 is a diagram illustrating interrupts of each sensor occurring as the wheel of a portable terminal rotates.
Figure 3A:
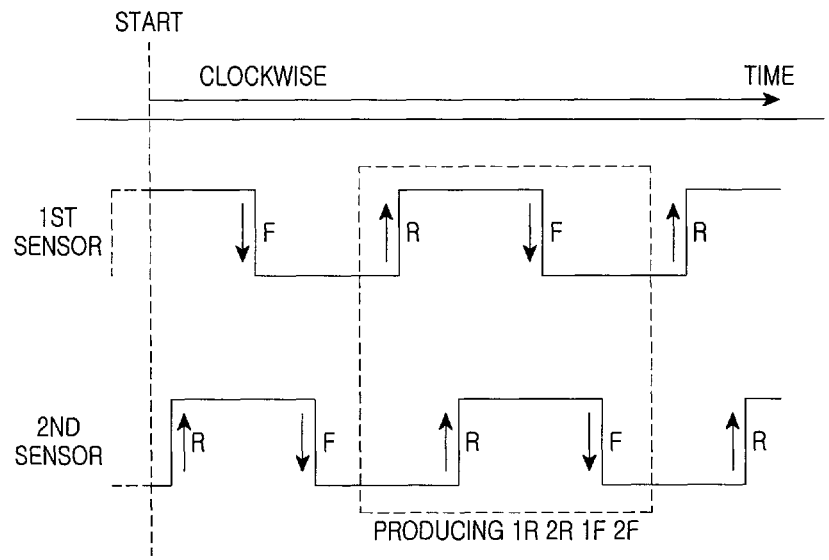
FIGS. 3A and 3B are diagrams illustrating interrupt transitions of each sensor occurring as the wheel of a portable terminal rotates.
Figure 3B:
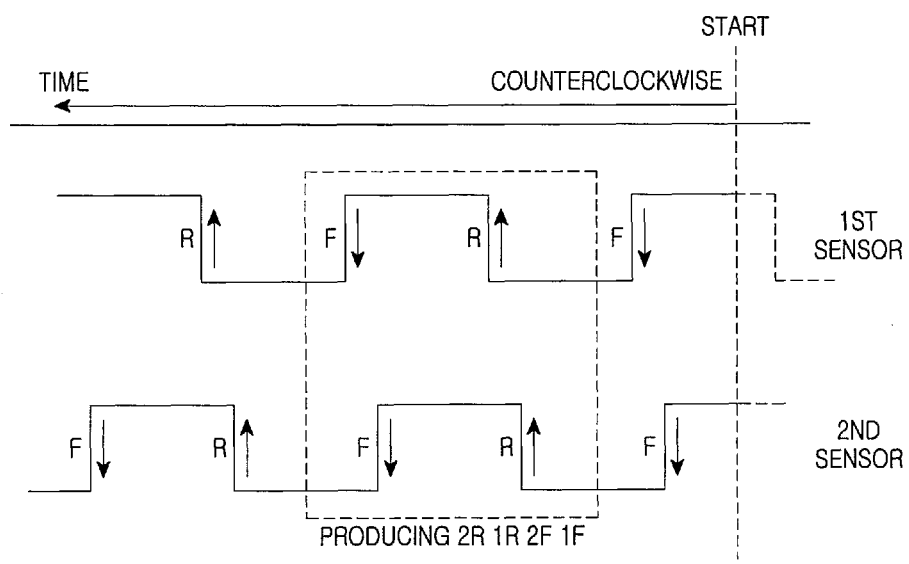

FIG. 2 is a diagram illustrating interrupts of each sensor produced as the wheel rotates, and FIGS. 3A and 3B are diagrams illustrating interrupt transitions of each sensor produced as the wheel rotates.

Referring to FIG. 2, according to a user's manipulation (in the clockwise or counterclockwise direction), the first and second sensors 61 and 62 produce interrupts (R or F) periodically within a time interval. A conventional sensing algorithm detects the rotating direction of the wheel through the interrupts of the first and second sensors 61 and 62 produced according to the rotation of the wheel. A conventional sensing algorithm will be described with reference to FIGS. 3A and 3B. An interrupt producing pattern corresponding to the clockwise rotation (for example, the interrupt values of 1R2R1F2F) and the interrupt producing pattern corresponding to the counterclockwise rotation (for example, the interrupt values of 2R1R2F1F) are determined. If interrupts corresponding to any of the interrupt producing patterns occur, it is determined that the wheel is rotated clockwise or counterclockwise. However, such a method lacks swiftness and precision in sensing the rotation of the wheel. For example, it is assumed that when rotating the wheel clockwise, the user rotated the wheel so that only interrupts of "1R2R1F" are produced, and after a length of time, the user rotated the wheel so that interrupts of "2F1R2R" are produced. In order to accept effectively the interrupts of "2F1R2R" produced after the production of the interrupts of "1R2R1F," it is necessary to standby for the time difference in producing the interrupts. Consequently, the swiftness of recognizing the rotation of the wheel is not good. In addition, even if it is assumed that interrupts of "1R2R1F2F1R2R" are generated without regard of the time difference, the production of the interrupts of "1R2R" is disregarded because only the interrupt pattern of "1R2R1F2F" is mapped as the clockwise rotation of the wheel. Consequently, the precision of sensing the rotation of the wheel is not good.

Figure 4:
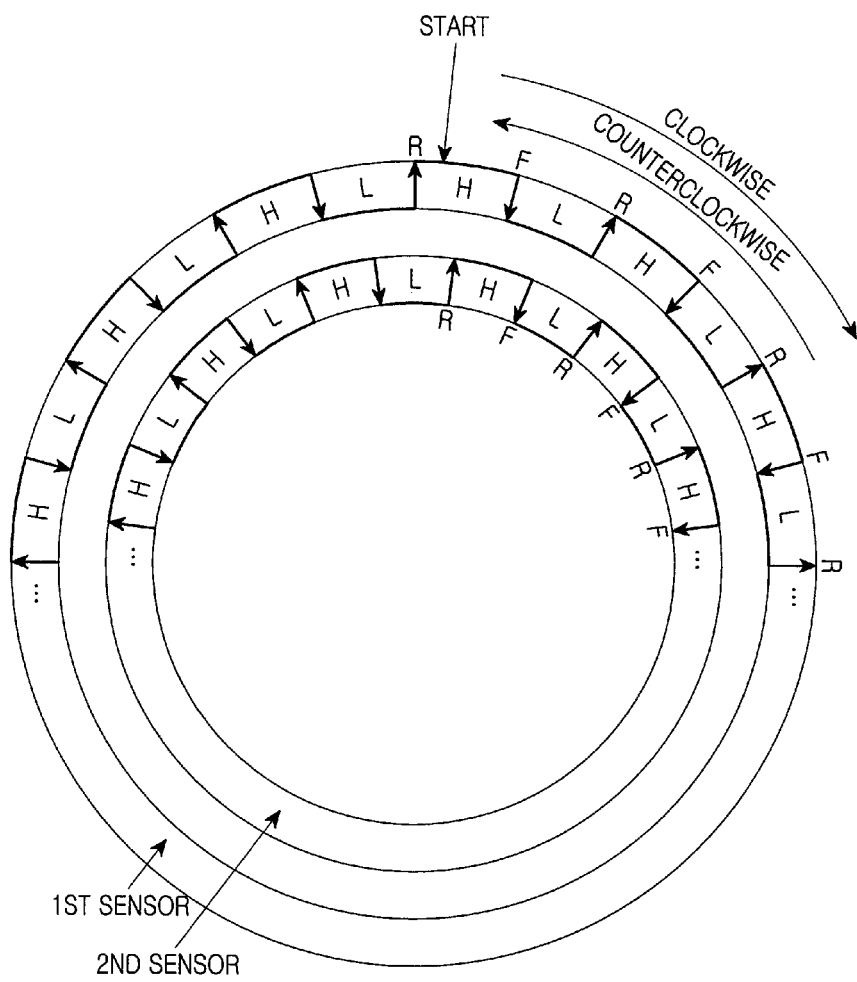
FIG. 4 is a diagram illustrating interrupt and status values of each sensor occurring as the wheel of a portable terminal rotates.
Figure 5A:
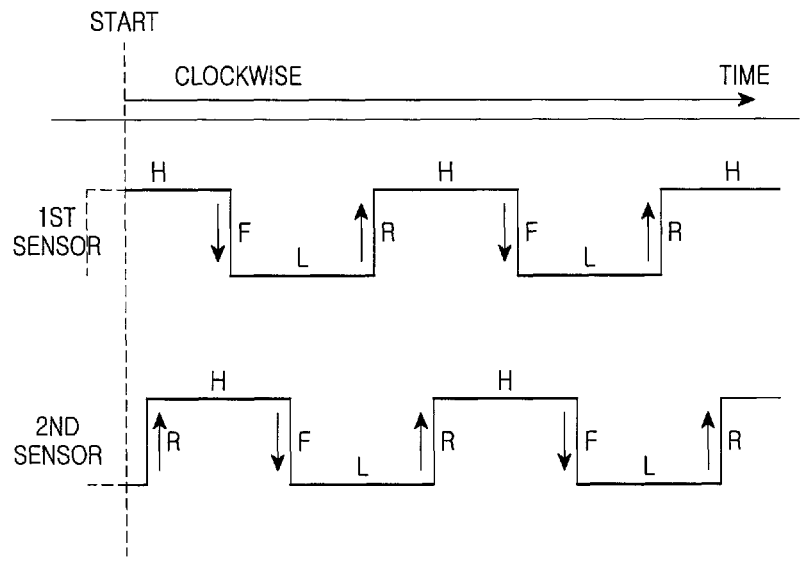
FIGS. 5A and 5B are diagrams illustrating interrupt transitions of each sensor occurring as the wheel of a portable terminal rotates.
Figure 5B:
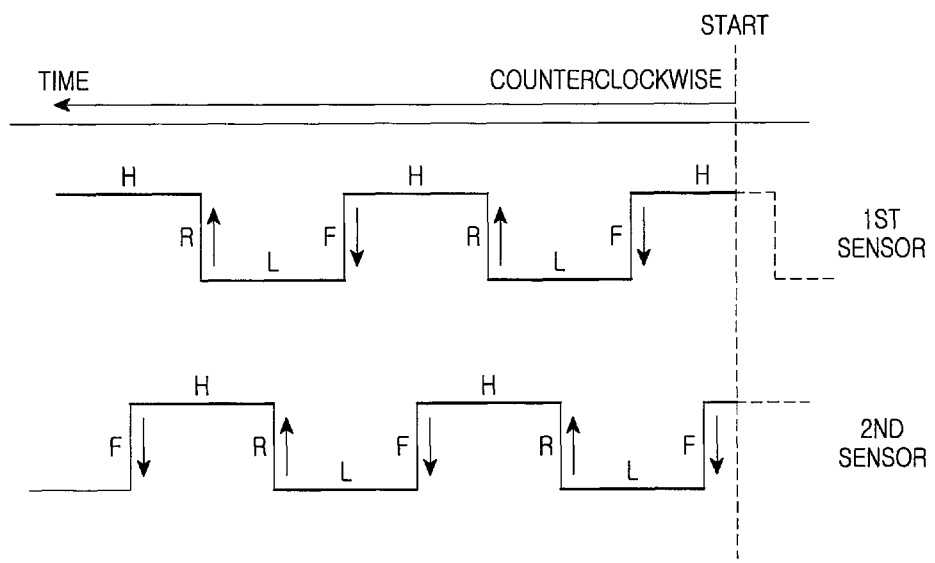

FIGS. 3A and 3B are diagrams illustrating interrupt transitions of each sensor produced as the wheel rotates, and FIG. 4 is a diagram illustrating interrupt and status values of each sensor produced as the wheel of a portable terminal rotates. In addition, FIGS. 5A and 5B are diagrams illustrating interrupt transitions of each sensor produced as the wheel rotates according to an exemplary embodiment of the present invention.

Referring to FIG. 4, if the wheel 60 rotates, the first and second sensors 61 and 62 provided on the wheel 60 produce interrupts (having interrupt values of R or F) or have predetermined status values (H or L) periodically within a time interval. Referring to FIGS. 5A and 5B, the sensing algorithm according to an exemplary embodiment of the present embodiment detects the rotation of the wheel 60 through the interrupt values and status values of each sensor according to a user's manipulation (in the clockwise or counterclockwise direction) of the wheel 60. That is, if either one of the first and second sensors 61 and 62 firstly produces an interrupt, such as rising edge (R) or falling edge (F), as the wheel 60 rotates, the sensing algorithm confirms the interrupt value, and at the same time the sensing algorithm confirms the status value of the other sensor not producing an interrupt. Thereafter, the sensing algorithm detects the rotation of the wheel 60 through the interrupt values and the status values confirmed thereby.

Now, rotation directions of the wheel 60 corresponding to the interrupt values and the state values are described with reference to mapping tables of FIGS. 6A and 6B. The mapping tables of FIGS. 6A and 6B present rotation directions of the wheel corresponding to the interrupt values (R or F) and the status values (H or L) of the first and second sensors 61 and 62, which are produced according to the user's manipulation of the wheel (in the clockwise or counterclockwise direction).

FIGS. 6A and 6B are diagrams illustrating mapping tables of a sensing algorithm according to an exemplary embodiment of the present invention. Referring to FIG. 6A, if the first sensor is the sensor producing interrupts as the wheel 60 rotates, a rotation direction of the wheel 60 corresponding to the status values (H or L) of the second sensor 62 related to the interrupt values (R or F) of the first sensor 61 is mapped in a mapping table. That is, if it is RL or FH in the order of the interrupt value of the first sensor 61 and the status value of the second sensor 62, the rotation direction is mapped as the clockwise direction, and if it is RH or FL, the rotation direction is mapped as the counterclockwise direction. FIG. 6B is a mapping table related to a case in which the sensor producing interrupts as the wheel 60 rotates is the second sensor 62. Therefore, the mapping table of FIG. 6B can be described in a similar manner as that of FIG. 6A. That is, if it is RH or FL in the order of the interrupt value of the second sensor 62 and the status value of the first sensor 61, a rotation direction is mapped as the clockwise direction, and if it is RL or FH, the rotation direction is mapped as the counterclockwise direction.

Figure 7:
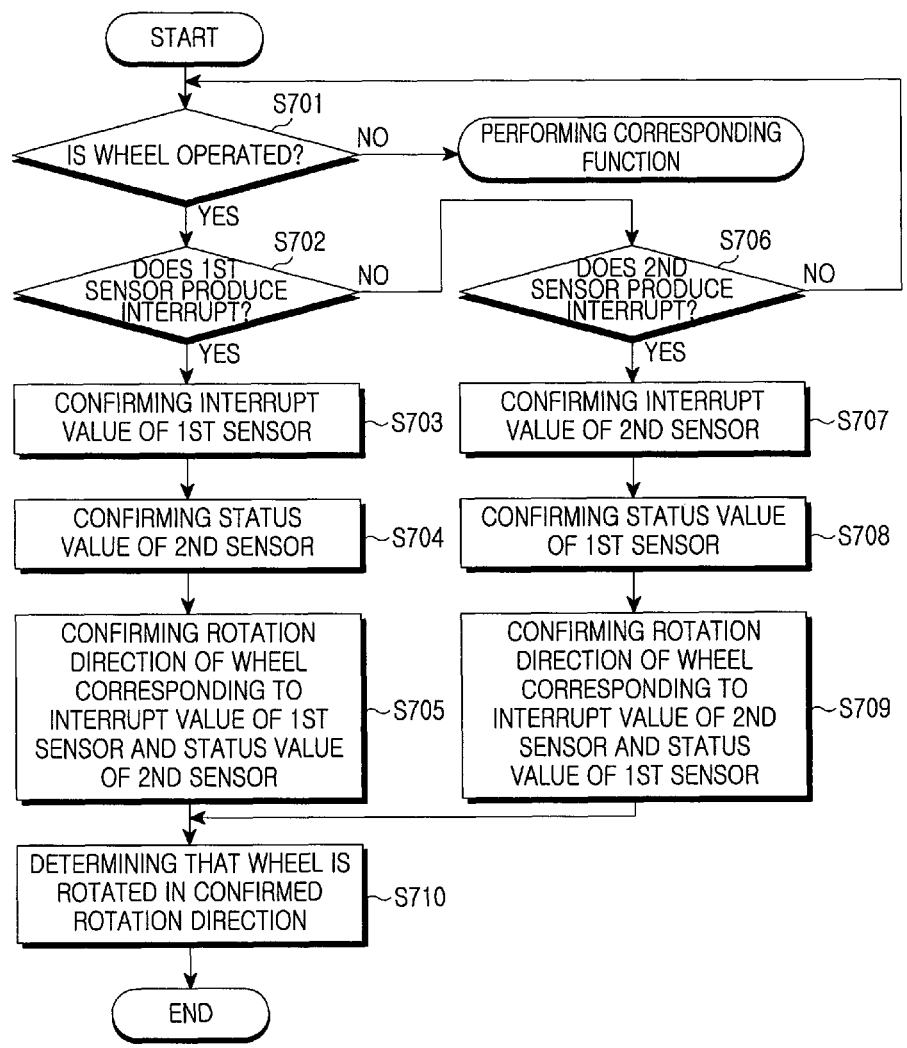
FIG. 7 is a flowchart illustrating a process of sensing movement of the wheel of a portable terminal according to an exemplary embodiment of the present invention.

FIG. 7 is a flowchart illustrating a process of sensing movements of the wheel according to an exemplary embodiment of the present invention.

If an interrupt is produced from a first sensor in step S702 as a user manipulates the wheel in step S701, the control unit 10 confirms an interrupt value of the first sensor 61 in step S703 and a status value of a second sensor which does not produce an interrupt in step S704.

More specifically, if the user manipulates the wheel in the clockwise or counterclockwise direction, either one of the first and second sensors 61 and 62 firstly produces an interrupt (R or F). Therefore, if the interrupt is produced from the first sensor 61 in step S702, the control unit 10 confirms the interrupt value of the first sensor 61 in step S703, i.e., whether the interrupt value is R or F. Then, the control unit confirms the status value (H or L) of the second sensor 62 in step S704 at the moment the first sensor 61 produces the interrupt.

Thereafter, the control unit 10 confirms the rotation direction of the wheel corresponding to the interrupt value of the first sensor and the status value of the second sensor in step S705.

The control unit 10 which confirms the interrupt value of the first sensor 61 and the status value of the second sensor 62 through steps S702 to S704 determines the rotation direction of the wheel corresponding to the interrupt value and the status value confirmed thereby. As described above with reference to FIG. 6A, if the user rotates the wheel 60, the first sensor 61 firstly produces an interrupt, and the rotation direction of the wheel 60, determined by the control unit 10, is varied depending on the status value of the second sensor 62 at the moment. That is, if the combination of the interrupt value of the first sensor 61 and the status value of the second sensor 61 are RL or FH, the control unit 10 determines that the wheel 60 rotated clockwise, and if the combination is RH or FL, the control unit 10 determines that the wheel 60 rotated counterclockwise.

In contrast, if a sensor which firstly produces an interrupt through the user's manipulation of the wheel in step S701 is the second sensor, the control unit 10 proceeds to step S706. The control unit 10 confirms the interrupt value of the second sensor in step S707 and confirms the status value of the first sensor at the moment the interrupt is produced by the second sensor in step S708.

As steps S706 to S708 are related to a case in which the sensor which firstly produced an interrupt according to the user's manipulation of the wheel is the second sensor 62, the description made above in relation to steps S702 to S704 can be similarly applied to steps S706 to S708.

Thereafter, the control unit 10 confirms the rotation direction of the wheel corresponding to the interrupt value of the second sensor and the status value of the first sensor in step S709.

The control unit 10 confirms the rotation direction of the wheel corresponding to the interrupt value of the second sensor 62 and the status value of the first sensor 61 confirmed through steps S707 and S708. As described above with reference to FIG. 6B, if the user rotates the wheel 60, the second sensor 62 firstly produces an interrupt, and the rotation direction of the wheel 60 determined by the control unit 10 is varied depending on the status value of the first sensor 61 at the moment. That is, if the combination of the interrupt value of the second sensor 62 and the status value of the first sensor 61 is RL or FH, the control unit 10 determines that the wheel 60 rotated clockwise, and if the combination is RH or FL, the control unit 10 determines that the wheel 60 rotated counterclockwise.

Thereafter, the control unit 10 determines that the wheel is rotated in the rotation direction confirmed in steps S705 and S709 in step S710.

Determining the rotation direction of the wheel confirmed through steps S705 or S709, the control unit 10 applies the rotation of the wheel according to a wheel's rotation-related operating mode. For example, if a wheel's rotation-related operating mode is a volume adjusting mode, the control unit 10 performs control in such a manner that the volume is increased according to the clockwise rotation of the wheel or the volume is decreased according to the counterclockwise rotation of the wheel.

As described above with reference to FIG. 5, according to an exemplary embodiment of the present invention, an interrupt value and a status value of the respective sensors according to the rotation of the wheel are designated as one pair, and it is determined that the wheel is rotated in the direction corresponding to the designated pair. In this manner, the control unit 10 according to an exemplary implementation may count a number of interrupts produced according to the rotation of the wheel 60, and determine that the wheel is rotated by an angle corresponding to the counted number. In an exemplary implementation, if the number of interrupts produced as the wheel rotates 360 degrees in one direction is 48 (the number of status values of the sensor not producing interrupts matched to the interrupt values is also 48), one interrupt value and status value pair corresponds to the rotation of 7.5 degrees.

As described above, according to exemplary embodiments of the present invention, the rotation of a wheel of a portable terminal can be more swiftly and precisely detected.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of sensing a rotation of a wheel in a portable terminal, the method comprising:
    storing at least one mapping table which correlates interrupt values and the status values of a plurality of sensors to the rotation of the wheel;
    producing at least one interrupt through any one of the plurality of sensors provided in the wheel according to the rotation of the wheel;
    confirming an interrupt value of the produced interrupt and a status value of a sensor which does not produce the interrupt among the plurality of sensors; and determining that the wheel is rotated in a direction corresponding to the interrupt value and the status value with reference to the at least one mapping table.

2. A method as claimed in claim 1, further comprising counting a number of interrupts produced according to the rotation of the wheel.

3. A method as claimed in claim 1, further comprising determining that the wheel is rotated by an angle corresponding to the number of produced interrupts.

4. A method as claimed in claim 2, further comprising determining that the wheel is rotated by an angle corresponding to the number of produced interrupts.

5. A device for sensing a rotation of a wheel in a portable terminal, the device comprising:
- a plurality of sensors, wherein each sensor produces at least one of an interrupt value and a status value according to the rotation of the wheel;
- a memory unit for storing at least one mapping table which correlates the interrupt values and the status values of the plurality of sensors to the rotation of the wheel; and
- a control unit for confirming an interrupt value of the produced interrupt and a status value of a sensor which does not produce the interrupt among the plurality of sensors, and for determining that the wheel is rotated in a direction corresponding to the interrupt value and the status value with reference to the at least one mapping table.

6. A device as claimed in claim 5, wherein the control unit controls in such a manner that the number of interrupts produced according to the rotation of the wheel is counted.

7. A device as claimed in claim 5, wherein the control unit determines that the wheel is rotated by an angle corresponding to the number of produced interrupts.

8. A device as claimed in claim 6, wherein the control unit determines that the wheel is rotated by an angle corresponding to the number of produced interrupts.

9. A portable terminal comprises:
- a wireless transmitting/receiving unit;
- an audio processing unit;
- a wheel;
- a memory unit for storing at least one mapping table which correlates interrupt values and status values of a plurality of sensors according to rotation of the wheel;
- a control unit for confirming an interrupt value of the produced interrupt and a status value of a sensor which does not produce the interrupt among the plurality of sensors, and for determining that the wheel is rotated in a direction corresponding to the interrupt value and the status value with reference to the at least one mapping table; and
- a display unit for outputting various pieces of display information generated by the portable terminal.

* * * * *